Patented Apr. 11, 1950

2,503,861

UNITED STATES PATENT OFFICE 2,503,861

2 - (MERCAPTOACETAMIDO) - BENZOTHIAZOLE AND ITS S-ACETYL DERIVATIVE

Arnold Weissberger, Rochester, N. Y., assignor to Eastman Kodak Company, Rochester, N. Y., a corporation of New Jersey No Drawing. Application March 2, 1949, Serial No. 79,318

3 Claims. (Cl. 260—305)

This invention relates to the new compounds 2-(mercaptoacetamido)-benzothiazole

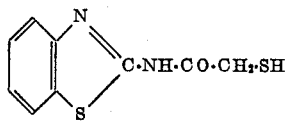

and its S-acetyl derivative, 2-(acetyl-mercaptoacetamido)-benzothiazole

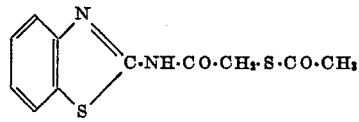

The object of the invention is to provide these compounds.

By way of illustrating the method of preparing my novel compounds, I give the following examples.

*Example I.*—2-(acetylmercaptoacetamido)-benzothiazole

To a stirred solution of 10 g. (0.067 mole) of 2-aminobenzothiazole and 8.6 g. (0.067 mole) of quinoline in 100 cc. of anhydrous dioxane at 50–60° C., was added 10.1 g. (0.067 mole) of acetylmercaptoacetyl chloride (acetylthioglycolyl chloride). The mixture separated into two layers, and the temperature rose to 80° C. The mixture was allowed to cool slowly to room temperature, and poured into water, from which it crystallized. The crude product had a melting point of 166–167° C. Recrystallization from alcohol gave 7.5 g. of 2-(acetylmercaptoacetamido) - benzothiazole, M. P. 170° C.

*Example II.*—2-(acetylmercaptoacetamido)-benzothiazole

A mixture of 125 g. of well pulverized 2-aminobenzothiazole, 1000 g. of dry dioxane and 101 g. of quinoline was treated with 125 parts of acetylmercaptoacetyl chloride with vigorous stirring. A vigorous exothermic reaction ensued. The starting material went completely into solution, and crystallization of the product began immediately. After cooling to room temperature, the reaction mixture was poured into an equal volume of water, and the precipitate which formed was filtered and dried. One recrystallization from a mixture of dioxane and ethyl acetate with Norit decolorizing carbon gave 139 g. of a colorless product, M. P. 165–166° C. A further recrystallization of a small sample from dioxane gave a product having a melting point of 167° C.

*Example III.*—2-(mercaptoacetamido)-benzothiazole

Two grams of 2-(acetyl-mercaptoacetamido)-benzothiazole was stirred for 10 minutes at room temperature in 50 ml. of 5% sodium hydroxide solution, during which time complete solution was attained. The mixture was then acidified by the slow addition of 10% hydrochloric acid, and the white precipitate was filtered and washed with water. After two recrystallizations from ethyl alcohol, 100 ml. of alcohol being used each time, the product melted at 191° C. A small amount of alcohol-insoluble material, melting at about 215° C. and thought to be the disulfide, was removed by filtration.

My novel compounds are useful as blue-black addition agents in photographic emulsions.

What I claim as new and desire to be secured by Letters Patent of the United States is:

1. A compound selected from the group consisting of 2-(mercaptoacetamido)-benzothiazole and 2-(acetylmercaptoacetamido)-benzothiazole.

2. The compound 2 - (mercaptoacetamido)-benzothiazole, having the formula

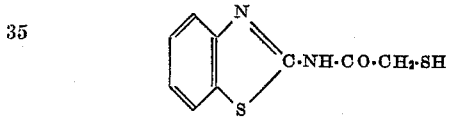

3. The compound 2-(acetylmercaptoacetamido)-benzothiazole, having the formula

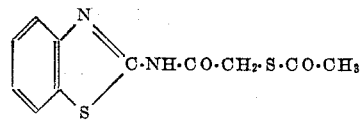

ARNOLD WEISSBERGER.

No references cited.